(12) United States Patent
Longdill et al.

(10) Patent No.: US 7,618,050 B2
(45) Date of Patent: Nov. 17, 2009

(54) VEHICLE STEERING ARRANGEMENTS

(75) Inventors: Simon James Longdill, Auckland (NZ); Hans Weekers, Auckland (NZ); Stephen John Briggs, Auckland (NZ)

(73) Assignee: Gibbs Technologies Ltd, Warwickshire (GB)

( * ) Notice: Subject to any disclaimer, the term of this patent is extended or adjusted under 35 U.S.C. 154(b) by 253 days.

(21) Appl. No.: 11/256,204

(22) Filed: Oct. 21, 2005

(65) Prior Publication Data
US 2006/0178058 A1    Aug. 10, 2006

(30) Foreign Application Priority Data
Oct. 22, 2004    (GB)    ................. 0423483.7

(51) Int. Cl.
*B60F 3/00* (2006.01)
(52) U.S. Cl. .............................. 280/124.134; 440/12.5
(58) Field of Classification Search ................ 440/12.5; 280/124.134, 124.135, 6.1, 93.51, 93.512
See application file for complete search history.

(56) References Cited
U.S. PATENT DOCUMENTS

| | | | |
|---|---|---|---|
| 3,280,785 A | 10/1966 | Mycroft | |
| 3,755,835 A | 9/1973 | Boersig | |
| 5,531,179 A * | 7/1996 | Roycroft et al. | ............ 440/12.5 |
| 5,590,617 A | 1/1997 | Gere | |
| 5,687,669 A | 11/1997 | Engler | |
| 5,727,494 A | 3/1998 | Caserta | |
| 6,796,856 B2 | 9/2004 | Ruddle | |

FOREIGN PATENT DOCUMENTS

| | | |
|---|---|---|
| EP | 1439970 B1 | 7/2005 |
| JP | 4-208611 A | 7/1992 |
| JP | 5024420 A | 2/1993 |
| WO | WO 01/74612 | 10/2001 |
| WO | WO 02/44006 | 6/2002 |
| WO | WO 2004/087443 | 10/2004 |

* cited by examiner

*Primary Examiner*—Stephen Avila
(74) *Attorney, Agent, or Firm*—Fulwider Patton LLP

(57) ABSTRACT

A vehicle steering arrangement for an amphibious vehicle having retractable steered wheels with which the steering input to such wheels is automatically substantially curtailed upon retraction of the wheels. Retraction of the wheels causes a steering link to swing toward its steering axis to thereby reduce its effective radius while steering input to a marine propulsion remains unchanged. The reduced steering input to the wheels reduces space needed to accommodate the wheels in their retracted position.

15 Claims, 6 Drawing Sheets

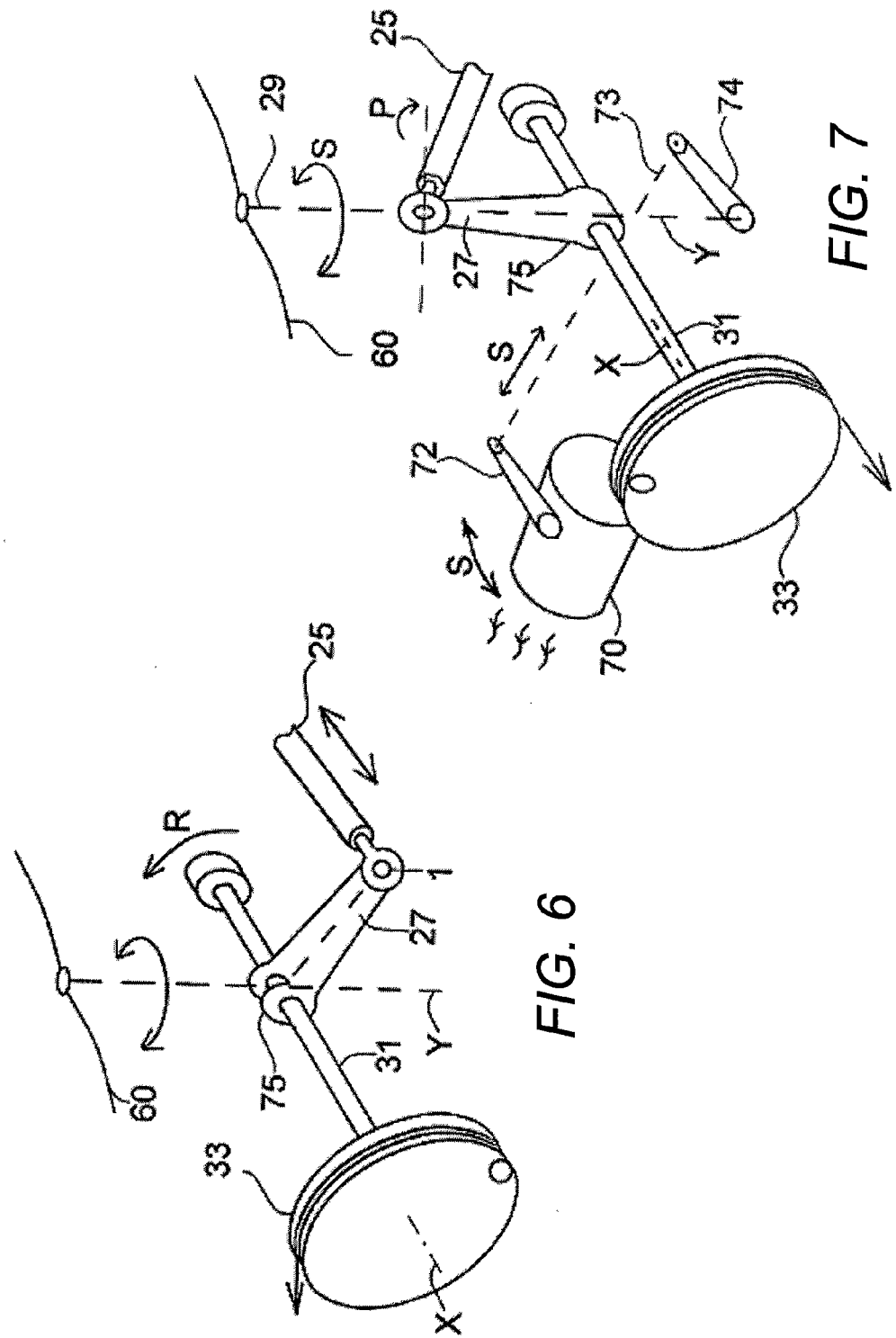

VEHICLE STEERING ARRANGEMENTS

CROSS-REFERENCES TO RELATED APPLICATIONS

This application claims priority from Great Britain Application Serial No. 0423483.7, filed Oct. 22, 2004.

BACKGROUND OF THE INVENTION

The present invention relates to vehicle steering arrangements and in particular to such arrangements for vehicles with retractable wheels.

Front wheels which are arranged to be steered and retracted for an amphibious vehicle are shown in our copending International Patent Application No PCT/GB04/001422. In that arrangement the wheels are retracted through nearly 90° so as to enable good clearance of the water; but also because there is plenty of room for accommodating the wheels. At the end of each steering arm articulatedly connected between the arm and an upright member on which the road wheel is mounted is a link, which is also articulated to the upright member. When the road wheel is protracted, the link is mostly horizontal and acts as an extension to the steering arm so as to steer the road wheel. When the road wheel is retracted, the link is mostly upright so that any movement of the steering arm such as occurs when steering the vehicle in water by directing a pump jet at the rear is not, or is largely not transmitted to the pivotally mounted upright member.

Therefore the retracted road wheels are not or are largely not caused to pivot. Any movement of the road wheels can be accommodated within pockets provided for accommodating most of the road wheels. In a case where it is not possible to rotate a steered suspension for a pair of road wheels to an angle as much as PCT/GB04/001422 indicates, any linkage as shown in that patent application will cause the road wheels to pivot when the vehicle is steered in water. To allow for this movement of the road wheels, the wheel pockets would have to be excessively large. This would result in loss of body space and could cause problems when the vehicle tramped on water, as the clearance around the wheels could allow water to be scooped up, causing excess spray and impeding forward progress.

Where it is necessary to retract the road wheels further so that the link at each end of the steering which connects to the upright member is, at full retraction, beyond vertical, that is, the link is angled inwards at, for instance, 20° to the vertical, then the same problem occurs as when the link is angled outwards, as described in the paragraph above.

SUMMARY OF THE INVENTION

According to a first aspect of the invention, there is provided a vehicle steering arrangement comprising at least a pair of steerable wheels, each mounted to a suspension arrangement arranged to swing upwards from a protracted road position to a retracted marine position, means associated with the suspension arrangement connected to a swingable connection on a steering column, the connection being connected to a track rod, the track rod having at each end a link articulatedly connected to an upright member of the suspension arrangement, the swingable connection on the steering column being so arranged that movement of the suspension from protraction to retraction causes the connection to swing from an active position whereby rotation of the steering column causes the track rod to move transversely and steer the road wheels, to an inactive position whereby rotation of the steering column is unable to fully move the track rod from a fully left to a fully right road steering position.

Throughout this specification (description and claims) it should be understood that the term "suspension upright" does not require a component to extend exactly vertically, but instead refers to a component to which the upper and lower suspension arms are connected at points spaced apart vertically.

According to a second aspect, the invention provides a suspension and steering arrangement for an amphibious vehicle comprising:
  at least a pair of steerable wheels each mounted for rotation on a hub assembly which in turn is mounted on a suspension arm;
  a retraction mechanism for raising and lowering the suspension arms between a lowered location for land mode operation of the vehicle and a raised location for marine mode operation of the vehicle; and
  a steering mechanism for steering the steerable wheels including:
  a steering column;
  a swing arm connected to the steering column by column connection means, the swing arm rotating with the steering column about an axis of the steering column and a distal end of the swing arm, furthest from column connection means, being connected by articulated connection means to a steering connector through which steering movement is imparted onwards through the steering mechanism; and
  rotation means for rotating the swing arm about the column connection means, wherein:
  the column connection allows the rotation means to rotate the swing arm between an extended position in which the distal end of the swing arm is furthest from the axis of rotation of the steering column and a retracted position in which the distal end of the swing arm is nearest to the axis of the steering column; and
  the rotation means is interconnected with the retraction mechanism so that on raising of the suspension arms the rotation means rotates the swing arm from the extended position to the retracted position thereof and on lowering of the suspension arms the rotation means rotates the swing arm from the retracted position to the extended position.

In a third aspect the present invention provides a suspension and steering arrangement for an amphibious vehicle comprising:
  at least a pair of steerable wheels each mounted for rotation on a hub assembly which in turn is mounted on a suspension arms;
  a retraction mechanism for raising and lowering the suspension arm;
  a retraction mechanism for raising and lowering the suspension arms between a lowered location for land mode operation of the vehicle and a raised location for marine mode operation of the vehicle; and
  a steering mechanism for steering the steerable wheels including:
  a steering column;
  a swing arm connected to the steering column by column connection means, the swing arm rotating with the steering column about an axis of the steering column and a distal end of the swing arm, furthest from the column connection means, being connected by articulated connection means to a steering connector through which steering movement is imparted onwards through the steering mechanism; and rotation means for rotating the swing arm about the column connection means; wherein:

the column connection means allows the rotation means to rotate the swing arm between an extended position in which the swing arm extends radially from the axis of rotation of the steering column and a retracted position in which the swing arm extends parallel to the axis of the steering column; and the rotation means is interconnected with the retraction mechanism so that on raising of the suspension arms the rotation means rotates the swing arm from the extended position to the retracted position thereof and on lowering of the suspension arms the rotation means rotates the swing arm from the retracted position to the extended position.

Deactivation of the road wheel steering reduces the pocket size for the wheels when retracted and the same steering column can be used to steer a water propulsion unit.

The suspension preferably comprises an upper wishbone connected to the upright member and a lower suspension member connected to the upright member and resilient means connected to the suspension to enable the wheels to have controlled vertical movement when in road mode. The arrangement of the suspension is such that if the steering is not centred, that is, if the wheels are "on lock", then the track rod with its extension link is extended to one side of the vehicle. As the wheels are retracted and the suspension starts to swing upwards, the centre of rotation of the suspension must also apply to the centre of rotation of the extension link about the end of the track rod. If the wheels are "on lock", then the upward rotational force on the suspension during retraction will cause the steering arm to centre so that the centre of rotation of the extension link is consistent with the effective centre of rotation of the suspension.

The provision of the track rod extension and its relationship to the retractable suspension therefore ensures that the road wheels neatly tuck away into a minimum space which can be readily shielded by a fairing so that they are recessed or else if only partly recessed, then the wheels, because they are centred, present a minimum frontage to the water on which the vehicle is travelling, into which it is tramping.

Preferably a retraction means is connected to a retraction arm, the retraction arm being connected to a suspension arrangement for moving at least one wheel between the protracted and retracted positions.

Preferably the swingable connection on the steering column is swung by means of a cable which extends from a retraction arm to an arrangement on the steering column.

The arrangement on the steering column is preferably an at least partly rotatable element to which the swingable connection is connected. The swingable connection may swing about an axis intersecting the axis of the steering column.

A lock may be provided to ensure that road steering is always active whenever the road wheels are protracted.

These and other features and advantages of the present invention will become apparent from the following detailed description of preferred embodiments which, taken in conjunction with the accompanying drawings, illustrate by way of example the principles of the present invention.

BRIEF DESCRIPTION OF THE DRAWINGS

An embodiment of the invention will now be described by way of example with reference to the accompanying drawings, in which;

FIGS. 6 and 7 are diagrammatic views of a mechanism for the arrangement of FIG. 1 for making the steering inactive relative to the road wheels.

DETAILED DESCRIPTION OF THE PREFERRED EMBODIMENTS

Figure 1:
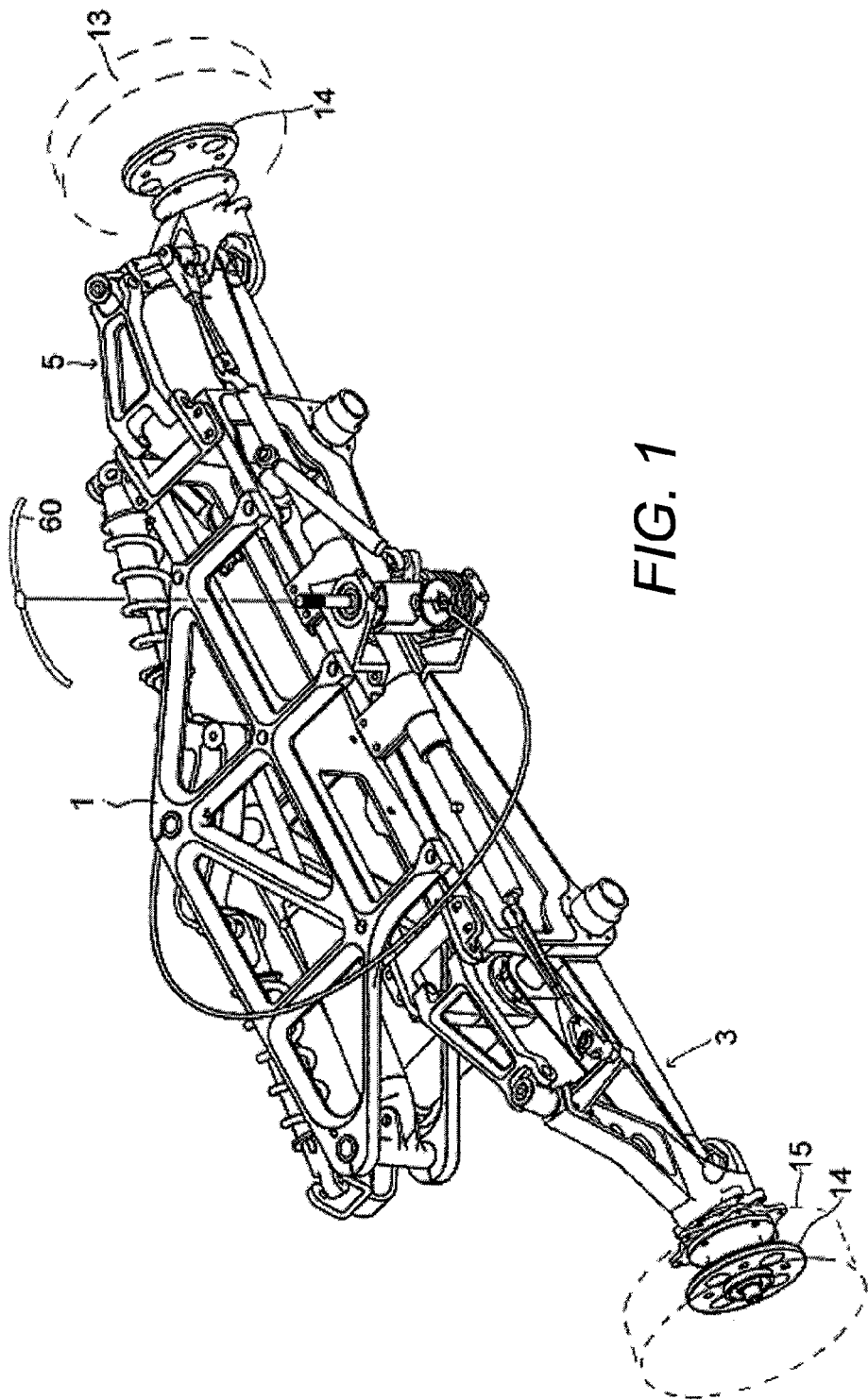
FIG. 1 is a view from the rear and partly to one side of a steering arrangement according to the invention with road wheels as shown in broken lines protracted.
Figure 2:
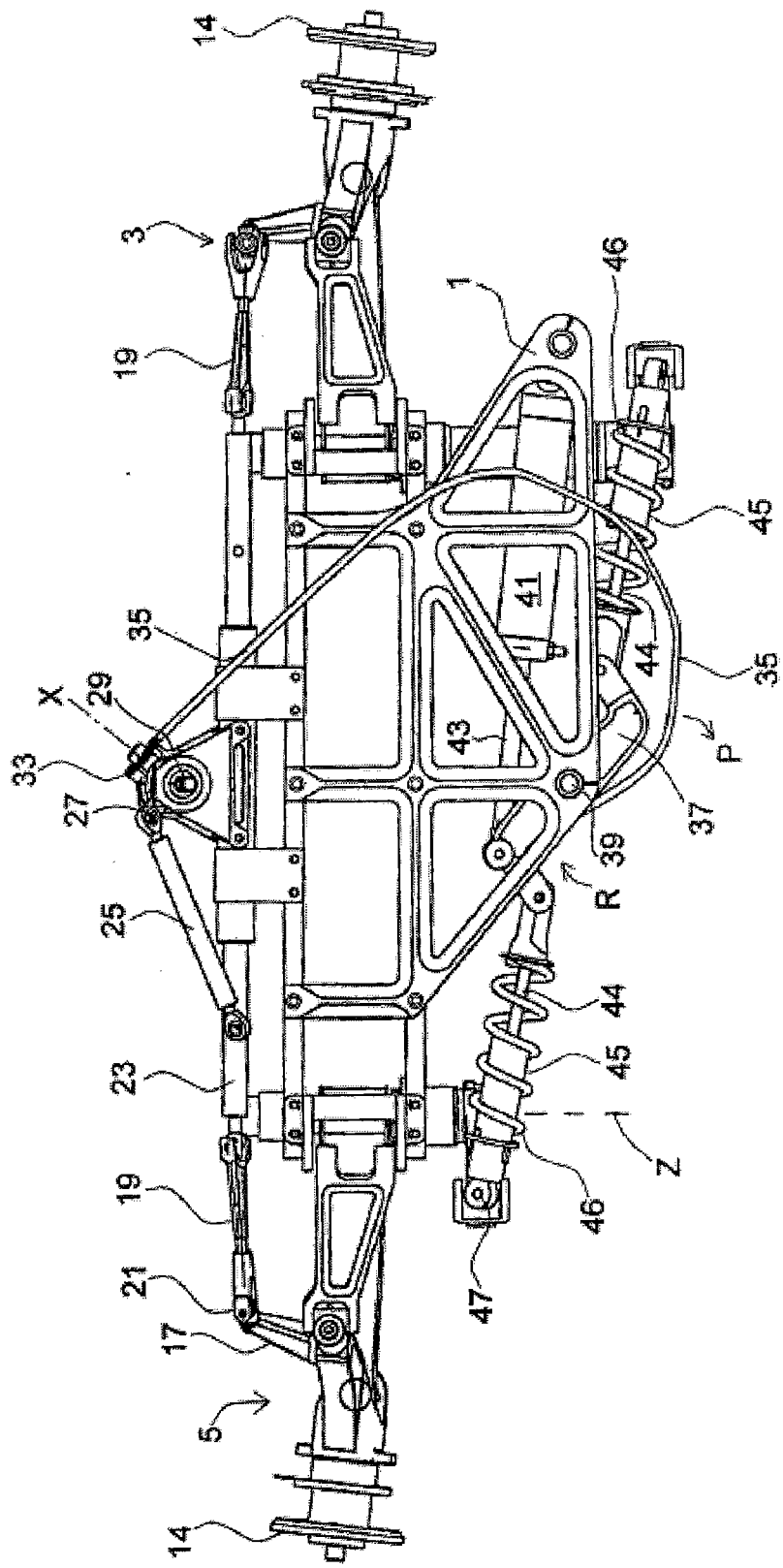
FIG. 2 is a plan view from above of FIG. 1 omitting the steering handles connected to the steering column with the wheels protracted and the wheels (not shown) steering slightly to the right.
Figure 3:
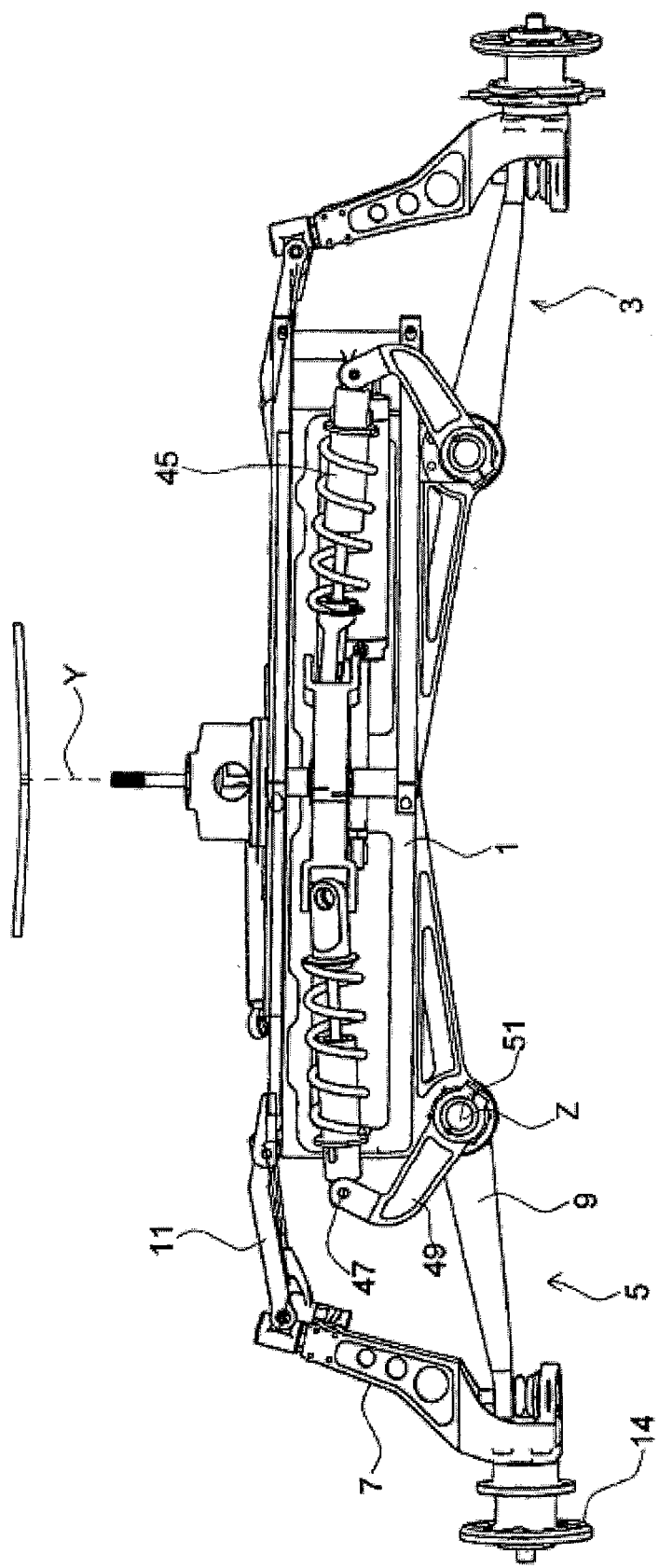
FIG. 3 is a front elevation of FIG. 1 with the wheels protracted.

In FIGS. 1 to 5 there is shown a frame 1 which is arranged to be mounted in the front of an amphibious vehicle. The frame has swingably mounted to it left and right suspensions 3 and 5 as seen from the rear of the vehicle.

Each suspension 3 and 5 comprises an upright member 7 (see FIG. 3) connected to a lower suspension arm 9 and an upper wishbone 11. Wheels 13 and 15 (shown in broken lines in FIG. 1) are each mounted to a hub 14, which is rotatably carried on upright member 7. The hub 14 and upright member 7 together form a hub assembly.

Extending forwardly of out from the upright member 7 is a steering arm 17 (see especially FIG. 2) to which is connected a track rod extension 19 at its outer end 21. The inner end of extension 19 is connected to track rod 23. The track rod 23 is moved transversely by means of link 25 which is connected to a swingable connection (or swing arm) 27 (see FIG. 2) on steering column 29. Connection 27 is mounted to column 29 so as to be able to swing about axis X and is connected by means of arbor 31 (see FIG. 6) to wheel 33. Wheel 33 is rotatably mounted to the bottom part of column 29 for actuation by means of cable 35 connected to a swing arm 37 which is pivotally mounted to frame 1 at 39.

An actuator 41 having piston rod 43 acts on one arm of swing arm 37 to pivot the arm, the outer ends of which are connected to piston rods 44 of suspension dampers 45, which are surrounded by coil springs 46. The base of each suspension damper 45 is connected at 47 to retraction arm 49 pivotally mounted at 51 to frame 1 so that on retraction each upper/lower suspension arm pair of the suspension swings about an axis running longitudinally fore and aft along the vehicle.

Figure 4:
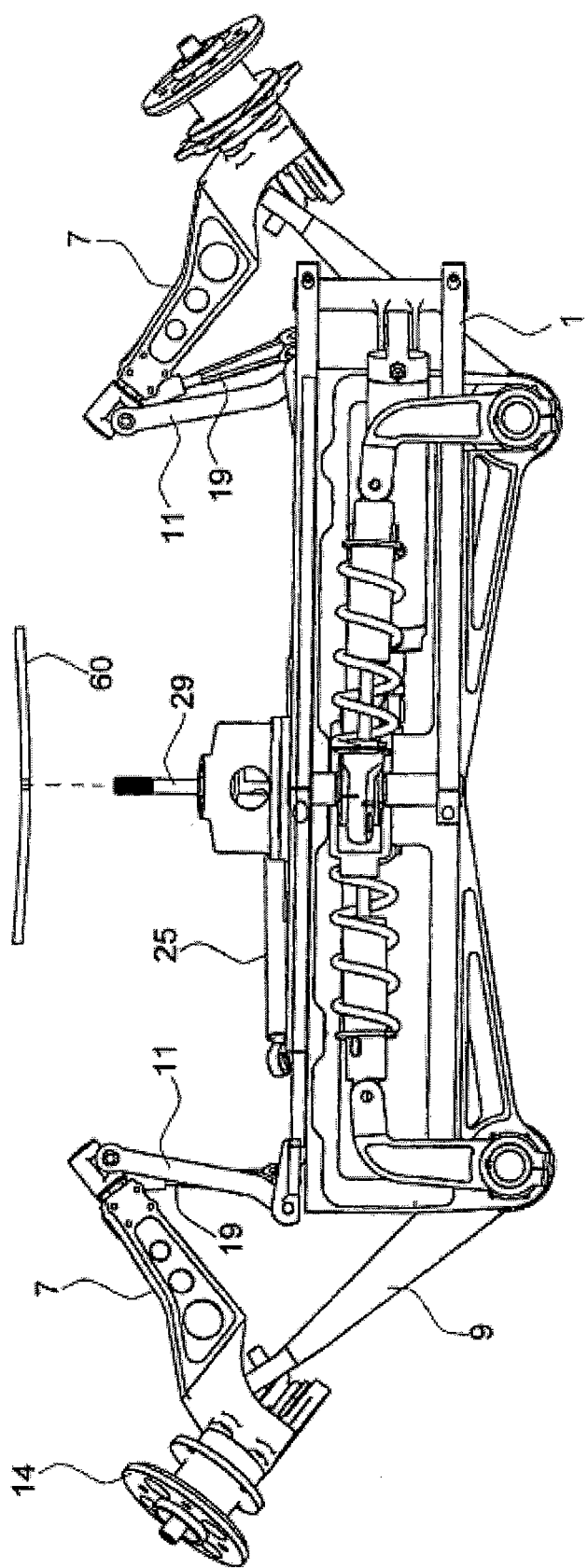
FIG. 4 is a front elevation of FIG. 1 with the wheels retracted (the right wheel being fully retracted and the left only partly retracted).

FIG. 4 shows the right hand suspension (on the left in FIG. 4) with the extension 19 almost vertical. If the left hand suspension were only retracted a degree or so further then any rotation of column 29 would have no effect on rotation of upright member 7. Once, however, retraction takes extension 19 past the vertical as shown on the right of FIG. 4, any movement of track rod 23 caused by handle bars 60, column 29 and link 25 would again cause the wheels to be steered. As that is not wanted in the retracted position but marine steering is required, the mechanism shown in FIGS. 6 and 7 is provided.

Diagrammatically FIG. 7 shows a steerable propulsion unit 70, suitably a water jet unit, which is linked via links 72, 73, and 74 to the column 29 which pivots about axis Y. So as to disable or deactivate the road steering, axes X and Y intersect at the pivot point 75 of connection 27 so that any rotation of the column about axis Y results in minimal action on link 25.

FIG. 7 shows the marine mode, with marine steering active, and road steering deactivated. Swingable connection 27 stands substantially vertically, and substantially along axis X so that rotation of handlebars 60 and steering column 29 has negligible effect on link 25 and therefore track rod 23. Therefore the road wheels move only fractionally when the vehicle is steered on water. As the road wheels are retracted from the protracted position shown in FIG. 3 to the retracted position shown in FIG. 4, swing arm 37 is rotated by cylinder 41 (FIG. 2), causing said retraction of suspension and therefore wheels. As swing arm 37 rotates, the proximal end of cable 35 is pulled. The distal end of cable 35 therefore rotates wheel 33, which in turn rotates arbor 31, and thus connection 27 in direction R in FIG. 6, until connection 27 is substantially vertical.

To effect wheel protraction, cylinder 41 extends, and swing arm 37 rotates in the opposite sense to that for protraction. Cable 35 is then pushed, causing wheel 33 to rotate in direction P in FIG. 7, until connection 27 is substantially horizontal, as shown in FIG. 6. Alternatively the wheel 33 could be spring-biased and rotated against the spring bias by the cable in tension and then rotates under the bias of the spring in the opposite directions. As the distal end of connection 27 now lies at a radius from axis X, it is once more able to steer the vehicle through link 25 and track rod 23. Marine steering will still be engaged in this land mode, however as no water is passing through the jet drive on land, it will have no effect other than to swing the steering bucket from side to side.

To prevent accidental disengagement of road steering on land, it is a simple matter to provide a lock to hold connection 27 in a substantially horizontal position. This could be achieved by providing a solenoid driven pin which locks connection 27 down once mode change form marine to land is complete. The use of such an electrical drive is convenient in that the pin firing signal can be made part of the vehicle mode change from marine mode to land mode. Alternatively, hydraulic or pneumatic power may be used, according to preference.

Figure 5:
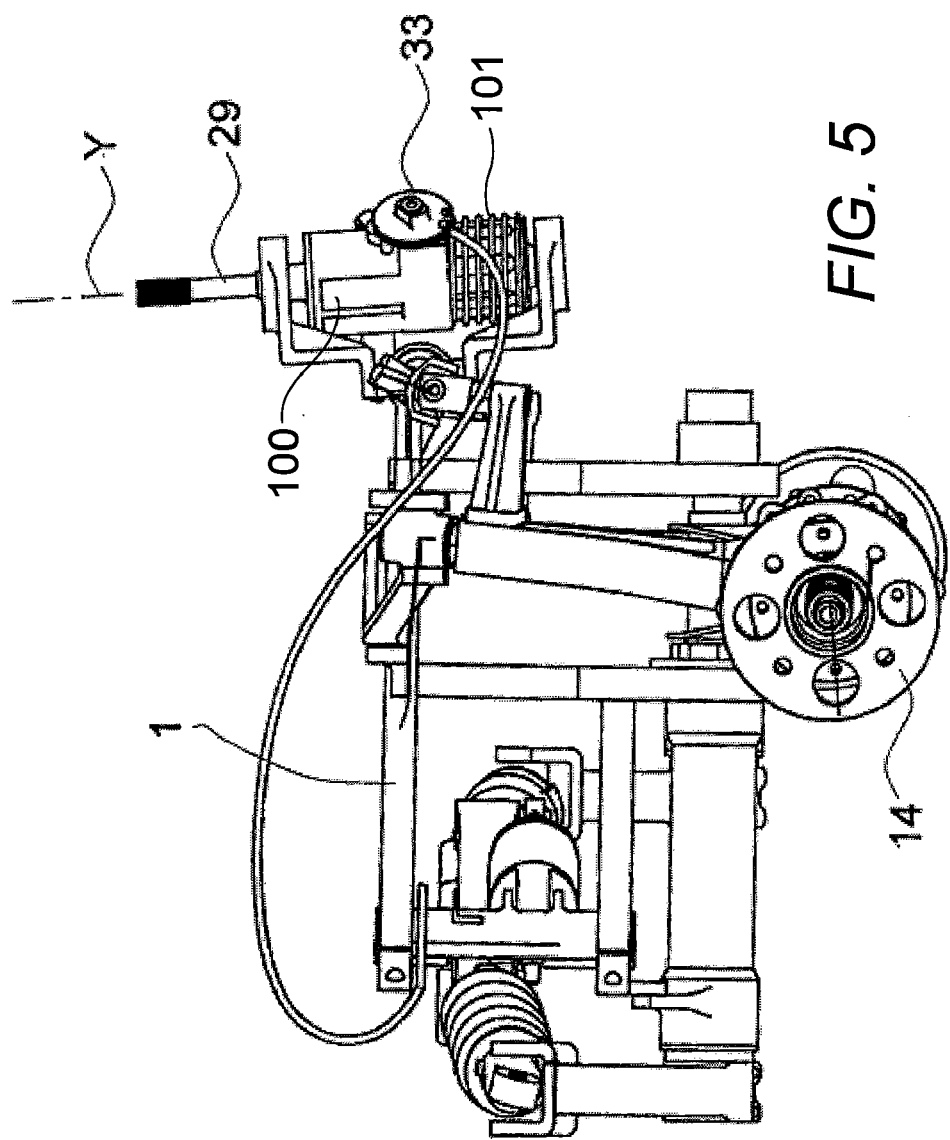
FIG. 5 is a side elevation of FIG. 1 with the wheels protracted.

A locking mechanism is shown in part in FIG. 5, comprising a sliding sleeve 100 aligned with column 29 with a slot for engaging and holding in position the swing arm 27. The wheel 33 is connected to the sleeve 100 so that the sleeve 100 is slid axially in one direction (against the force of a biasing spring 101) to release the swing arm 27 to move freely as the wheel is rotated in one direction; the rotation of the wheel 33 in the other direction allows the sleeve to slide in the other direction under the action of the spring 101 to engage the connection 27 in its slot and hold it fast.

It should be noted that further refinements may be made to the steering arrangement described above without departing from the essential inventive concept. For example, an individual retraction arrangement could be provided for each road wheel, as described in the applicant's co-pending application published as WO02/44006. The suspension may not use coil springs, but may use torsion bars; or a combined hydraulic spring, damper, and retraction unit, as described in the applicant's co-pending application published as WO01/74612. Alternatively, wheel retraction may be powered pneumatically or electrically. The steering mechanism may have power assistance. The marine drive may be an open propeller, or a ducted propeller. Accordingly, it is not intended that the invention be limited except by the appended claims.

What is claimed is:

1. A vehicle steering arrangement for an amphibious vehicle comprising:

at least a pair of steerable wheels each mounted to a suspension arrangement arranged to swing upwards from a protracted road position to a retracted marine position, wherein a retraction arm is connected to said suspension arrangement for moving at least one wheel between the protracted and retracted positions upon rotation of a swing arm;

a driver for relaying motion from the suspension arrangement to a swingable connection on a steering column on protraction and on retraction of the suspension arrangement, wherein the swingable connection is connected to a track rod having at each end a link articulatedly connected to an upright member of the suspension arrangement, the swingable connection on the steering column being so arranged that movement of the suspension from protraction to retraction causes the connection to swing from an active position, in which active position rotation of the steering column causes the track rod to move transversely and steer the road wheels, to an inactive position, in which inactive position rotation of the steering column is unable to fully move the track rod from a fully left to a fully right road steering position, and wherein the driver for pivoting the swingable connection from the active to the inactive position comprises a cable from the swing arm to an arrangement on the steering column.

2. An arrangement as claimed in claim 1, wherein the suspension arrangement comprises at least an upper wishbone and a lower suspension arm connected to the upright member, wherein said lower suspension arm is resiliently supported.

3. An arrangement as claimed in claim 1, wherein the swingable connection is arranged to swing about an axis intersecting the axis of the steering column.

4. An arrangement as claimed in claim 1, wherein a lock is provided to lock the swingable connection in the active position to ensure that road steering is always active whenever the road wheels are protracted.

5. A suspension and steering arrangement for an amphibious vehicle comprising:

at least a pair of steerable wheels each mounted for rotation on a hub assembly which in turn is mounted on a suspension arm;

a retraction mechanism for raising and lowering the suspension arms between a lowered location for land mode operation of the vehicle and a raised location for marine mode operation of the vehicle; and a steering mechanism for steering the steerable wheels, including:

a steering column;

a swingable connection rotatably connected to the steering column, the swingable connection rotating with the steering column about an axis of the steering column and a distal end of the swingable connection, furthest from column connection means, is connected by an articulated connection to a steering connector through which steering movement is imparted onwards through the steering mechanism; and a rotation mechanism for rotating the swingable connection relative to the steering column between an extended position in which the distal end of the swingable connection is furthest from the axis of rotation of the steering column and a retracted position in which the distal end of the swingable connection is nearest to the axis of the steering column; and the rotation mechanism is interconnected with the retraction mechanism so that on raising of the suspension arms the rotation mechanism rotates the swingable connection from the extended position to the retracted position thereof and on lowering of the suspension arms the rotation mechanism rotates the swingable connection from the retracted position to the extended position.

6. A suspension and steering arrangement as claimed in claim 5, wherein:
in the extended position thereof the swingable connection extends radially from the steering column; and
in the retracted position thereof the swingable connection extends parallel to the steering column.

7. A suspension and steering arrangement as claimed in claim 5, comprising additionally a lock for locking the swingable connection in the extended position thereof whilst the suspension arms are in their lowered locations for land mode operation.

8. A suspension and steering arrangement as claimed in claim 7, wherein the lock comprises a slidable sleeve aligned with the steering column axis and having a slot for securing the swingable connection in the extended position thereof, the rotation means sliding the sleeve from a position in which the swingable connection is secured in the slot to a position in which the swingable connection is free of the slot as the wheels are raised.

9. A suspension and steering arrangement as claimed in claim 5, wherein the rotation mechanism is mechanically connected to the retraction mechanism.

10. A suspension and steering arrangement as claimed in claim 9, wherein the rotation mechanism is connected by a cable to the retraction mechanism.

11. A suspension and steering arrangement as claimed in claim 10, wherein:
the suspension arms are each connected via a spring and damper assembly individual thereto to a swing arm of the retraction mechanism, the swing arm being common to both suspension arms, the suspension arms being connected to the swing arm on opposite sides of an axis of rotation of the swing arm; the retraction mechanism comprises a hydraulic ram which acts on the swing arm to rotate the swing arm to thereby lower and raise the wheels; and the cable is connected to the swing arm.

12. A suspension and steering arrangement as claimed in claim 5, wherein the steering mechanism comprises a track rod extending transversely across the vehicle and slidably mounted to the vehicle so as to allow only transverse axial motion of the track rod, the track rod being pivotally connected at each end to a wheel hub assembly and the steering connection being pivotally connected to the track rod whereby rotation of the swing arm when extended causes the steering connector to slide the track rod axially to rotate the wheel hub assemblies about steering axes thereof.

13. A suspension and steering arrangement for an amphibious vehicle comprising:
at least a pair of steerable wheels each mounted for rotation on a hub assembly which in turn is mounted on a suspension arms;
a retraction mechanism for raising and lowering the suspension arms between a lowered location for land mode operation of the vehicle and a raised location for marine mode operation of the vehicle; and
a steering mechanism for steering the steerable wheels including:
a steering column;
a swingable connection connected to the steering column, the swingable connection rotating with the steering column about an axis of the steering column and a distal end of the swingable connection, furthest from said axis of the steering column, being connected by an articulated connection to a steering connector through which steering movement is imparted onwards through the steering mechanism;
a lock for locking the swingable connection in the extended position thereof whilst the suspension arms are in their lowered locations for land mode operation wherein the lock comprises a slidable sleeve slidable co-axial with the steering column and having a slot for securing the swingable connection in the extended position thereof, the rotation mechanism sliding the sleeve from a position in which the swingable connection is secured in the slot to a position in which the swingable connection is free of the slot as the wheels are raised; and
a rotation mechanism for rotating the swingable connection between an extended position in which the swing arm extends radially from the axis of rotation of the steering column and a retracted position in which the swing arm extends parallel to the axis of the steering column, wherein the rotation mechanism is interconnected with the retraction mechanism so that suspension arm position controls the position of the swingable connection.

14. A suspension and steering arrangement as claimed in claim 13, wherein the rotation mechanism is mechanically connected to the retraction mechanism.

15. A suspension and steering arrangement as claimed in claim 14, wherein the rotation mechanism is connected by a cable to the retraction mechanism.

* * * * *

UNITED STATES PATENT AND TRADEMARK OFFICE
CERTIFICATE OF CORRECTION

PATENT NO. : 7,618,050 B2  Page 1 of 1
APPLICATION NO. : 11/256204
DATED : November 17, 2009
INVENTOR(S) : Longdill et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 483 days.

Signed and Sealed this

Nineteenth Day of October, 2010

David J. Kappos
*Director of the United States Patent and Trademark Office*